(12) United States Patent
Tanaka et al.

(10) Patent No.: US 6,693,163 B2
(45) Date of Patent: *Feb. 17, 2004

(54) SOLID-PHASE DRYING AND SOLID-PHASE POLYMERIZATION OF POLYAMIDE

(75) Inventors: Kazumi Tanaka, Niigata (JP); Hideyuki Kurose, Niigata (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/098,056

(22) Filed: Mar. 15, 2002

(65) Prior Publication Data

US 2003/0176624 A1 Sep. 18, 2003

(51) Int. Cl.[7] .......................... C08G 69/04; C08G 69/06
(52) U.S. Cl. .................. 528/310; 528/312; 528/313; 528/322; 528/332; 528/335; 528/336; 528/337; 528/480; 528/502 R; 528/502 C
(58) Field of Search .................. 528/480, 312, 528/310, 332, 313, 322, 335, 336, 337, 502 R, 502 C

(56) References Cited

U.S. PATENT DOCUMENTS 4,596,866 A * 6/1986 Jackson et al. ............. 528/347
5,250,619 A * 10/1993 Heinz et al. ............... 525/92 B
5,576,415 A * 11/1996 Tanaka ...................... 528/310
5,708,125 A * 1/1998 Liedloff et al. ............ 528/310
5,773,555 A   6/1998 Weger et al.
6,069,228 A * 5/2000 Alsop et al. ................ 528/310
6,303,741 B1 * 10/2001 Tanaka ...................... 528/332

FOREIGN PATENT DOCUMENTS

EP          0 703 264 A2        3/1996

OTHER PUBLICATIONS

European Search Report for EP 02 00 6501, completed Aug. 12, 2002.

* cited by examiner

Primary Examiner—P. Hampton-Hightower
(74) Attorney, Agent, or Firm—Antonelli, Terry, Stout & Kraus, LLP

(57) ABSTRACT

In the method for solid-phase drying or solid-phase polymerizing a polyamide of the present invention, the polyamide that is stored for 20 days or longer after the production thereof until subjected to the solid-phase drying or the solid-phase polymerization under the specific conditions is used as the starting material. By storing the polyamide under the specific conditions of the present invention, the resultant solid-phase dried or solid-phase polymerized polyamide with a low yellowness is obtained even if 20 days or more time has lapsed after the starting polyamide is produced until it is subjected to the solid-phase drying or solid-phase polymerization.

19 Claims, 1 Drawing Sheet

Storage Term Before Solid-Phase Polymerization (Days)

SOLID-PHASE DRYING AND SOLID-PHASE POLYMERIZATION OF POLYAMIDE

BACKGROUND OF THE INVENTION

1. Field of the Invention

The present invention relates to a method for producing a solid-phase dried or solid-phase polymerized polyamide. More specifically, the present invention relates to a method for producing the solid-phase dried or solid-phase polymerized polyamide with little increase in yellowness by solid-phase drying or solid-phase polymerizing a polyamide comprising a diamine component containing 70 mol % or more of xylylene diamine and a dicarboxylic acid component containing 70 mol % or more of adipic acid.

2. Description of the Prior Art

Polyamides are materials excellent in heat resistance, chemical resistance, mechanical properties and moldability, and have been widely used as synthetic fibers, molding materials for automotive parts, etc., packaging materials such as film, etc. Recently, in various fields of polyamide applications, the development of new products is forwarded to achieve still higher performance, and it is demanded to develop a polyamide having still higher heat resistance, mechanical strength and gas barrier properties as well as showing no reduction in mechanical properties due to water absorption.

As a polyamide having a low water absorption, a high mechanical strength and high gas barrier properties, is known nylon MXD6 that is prepared by the polycondensation of m-xylylene diamine and adipic acid. Japanese Patent Application Laid-Open No. 6-192416 proposes, as a polyamide that is excellent in moldability and mechanical properties even when absorbing water, a polyamide prepared by the polycondensation of p-xylylene diamine, hexamethylene diamine and adipic acid. These polyamides prepared by using xylylene diamine draw attention as a polyamide having a high heat resistance, a high mechanical strength, high gas barrier properties and showing no reduction in mechanical properties due to water absorption.

Since a polyamide is a water-absorptive thermoplastic resin and a solid polyamide absorbs water or moisture in an amount exceeding its saturation amount at molten state, the polyamide should be dried prior to molding or forming process. Alternatively, a dried polyamide is packed into a moistureproof packaging bag for shipping, and then, used as a material for molding or forming. Polyamide is generally dried in a solid state after producing a melt-polymerized polyamide. A melt drying method using an extruder, etc. is disadvantageous in view of the productivity and the coloring or yellowing due to heat history.

As a material for producing solid article, a low viscosity polyamide is used, because the molding is carried out by injection molding that requires polyamide to be highly flowable in a molten state. In contrast, as a material for producing bottle, sheet, film, fiber, etc., a low-, medium- or high-viscosity polyamide is used because these products are produced by extrusion in addition to injection molding, and therefore, a molten polyamide is required to have a flowability lower than used as a materiel for producing solid article. To produce a medium-to-high viscosity polyamide by melt polymerization, the polymerization under molten state should be carried out in a longer period of time, this likely to cause degradation of polyamide due to increased heat history resulted by the prolonged reaction time. In addition, a polymerization apparatus with specific design is needed, because a sufficient power for maintaining the molten state of polyamide in a polymerization tank uniform cannot be obtained by an agitation apparatus for general use. Further, the operation for taking out a molten medium-to-high viscosity polyamide from a polymerization tank is rather difficult as compared with taking out a low-density polyamide, and the amount of a residual polyamide adhering to the inner wall of the polymerization tank becomes larger as compared with the production of a low-density polyamide. Thus, the production of the medium-to-high viscosity polyamide by melt polymerization is undesirable.

Therefore, the medium-to-high polyamide has been generally produced by a so-called solid-phase polymerization where a low-density polyamide is first produced by a melt polymerization and then the low-density polyamide is heat-treated in solid state. Since the degree of polymerization can be increased at temperatures lower than the melting point, the solid-phase polymerization is superior to the melt polymerization in avoiding the coloring due to heat degradation. Therefore, the solid-phase polymerization has been widely used in various manners.

Since polyamide is, as its inherent feature, liable to be colored yellow by oxidative degradation or heat degradation during the molding or forming process, a polyamide as little colored as possible is desired as a material for molding or forming. As a method for preventing the coloring by the oxidative degradation during the solid-phase drying and solid-phase polymerization, there have been known a method where polyamide is treated by heating from a heat transfer surface and a method where polyamide is treated in an inert gas atmosphere such as heated dry nitrogen. Polyamide for use as a starting material is generally subjected to the solid-phase drying and solid-phase polymerization relatively immediately (without storing for a long term) after produced by the melt polymerization, etc. In such a case, it is sufficient for preventing the coloring to take care only to remove oxygen during the solid-phase drying and solid-phase polymerization. However, the oxidative degradation cannot be effectively prevented only by the oxygen removal when a long term storage of a polyamide for use as a starting material is unavoidable, for example, in case of an apparatus for the solid-phase drying or polymerization being troubled thereby disenabling the solid-phase drying or polymerization immediately after the production of the starting polyamide; in case of the solid-phase drying being repeated because of moisture absorption after the solid-phase drying or polymerization; in case of the solid-phase polymerization being repeated to further increase the molecular weight after the solid-phase drying or polymerization; or in case of the melt polymerization for producing the starting polyamide being carried out at a site being far away from the site of the solid-phase drying or polymerization.

Japanese Patent Application Laid-Open No. 2000-129119 discloses a method for spraying water onto the surface of polyamide that is produced by a melt polymerization. This method is intended to prevent the polyamide from contacting air by covering the surface of polyamide with surplus water after increasing the water content of polyamide. However, to obtain the effect continuously, a water film must be maintained on polyamide by continuously supplying excess water over the saturated amount, this being not practical for a long term storage. In addition, such an excess water necessitates a significantly large heat load and a prolonged time in the subsequent solid-phase drying or polymerization step. Thus, the proposed method is industrially disadvantageous.

It has been known to add an polyamide with a stabilizing agent such as phosphoric acid, phosphorous acid, hypophosphorous acid, and salts and compounds thereof to prevent the heat degradation or the oxidative degradation (Japanese Patent Publication No. 48-23199). However, the coloring during the solid-phase drying or solid-phase polymerization cannot be prevented sufficiently even by the addition of such stabilizing agents. In addition, since the stabilizing agent acts also as a polymerization promoter for polyamide, the addition of the stabilizing agent in an amount larger than needed is undesired in view of controlling the degree of polymerization.

SUMMARY OF THE INVENTION

An object of the present invention is to provide a method for solid-phase drying or solid-phase polymerizing polyamide with a low increase in the yellowness.

As a result of intensive study in view of solving the above problem, the inventors have found that the yellowing of a polyamide due to the oxidative degradation during a solid-phase drying or a solid-phase polymerization, even after stored for 20 days or longer from the production of the polyamide, can be effectively prevented by controlling the oxygen partial pressure, the relative humidity and the temperature of the atmosphere to which the polyamide being stored is exposed, the term for storage and the crystallization degree of the polyamide being stored, or by pre-treating the polyamide under specific conditions with a decreased oxygen partial pressure prior to the solid-phase drying or the solid-phase polymerization. The present invention has been accomplished on the basis of this finding.

Thus, the present invention provides a method for solid-phase drying or solid-phase polymerizing a polyamide that comprises a diamine component containing 70 mol % or more of xylylene diamine and a dicarboxylic acid component containing 70 mol % or more of adipic acid, the method comprising solid-phase drying or solid-phase polymerizing the polyamide that is stored for 20 days or longer after the production thereof until subjected to the solid-phase drying or the solid-phase polymerization under conditions satisfying the following Formula A:

$$0.8\times10^{-9} \geq P\times D^{0.5}\times exp\{-6002/T+(1-2\times C/100)\times(a\times(h/100-0.6)^2+0.62)\} \quad (A)$$

wherein P is an oxygen partial pressure (MPa) of an atmosphere to which the polyamide is exposed; h is relative humidity (%RH) of the atmosphere to which the polyamide is exposed; D is a storage time (days); T is a temperature (K) of the atmosphere to which the polyamide is exposed; C is a crystallization degree (%) of the polyamide; a is a numerical value of 2.9 when h is less than 60%RH or 18.8 when h is 60%RH or higher, at a temperature lower than a glass transition temperature of the polyamide while shielding against light.

The present invention further provides a method for solid-phase drying or solid-phase polymerizing a polyamide that comprises a diamine component containing 70 mol % or more of xylylene diamine and a dicarboxylic acid component containing 70 mol % or more of adipic acid, the method including a step of exposing the polyamide to an atmosphere having an oxygen partial pressure of 1 kPa or less at 120° C. or lower for 2 h or more in an apparatus.

DETAILED DESCRIPTION OF THE INVENTION

Figure 1:
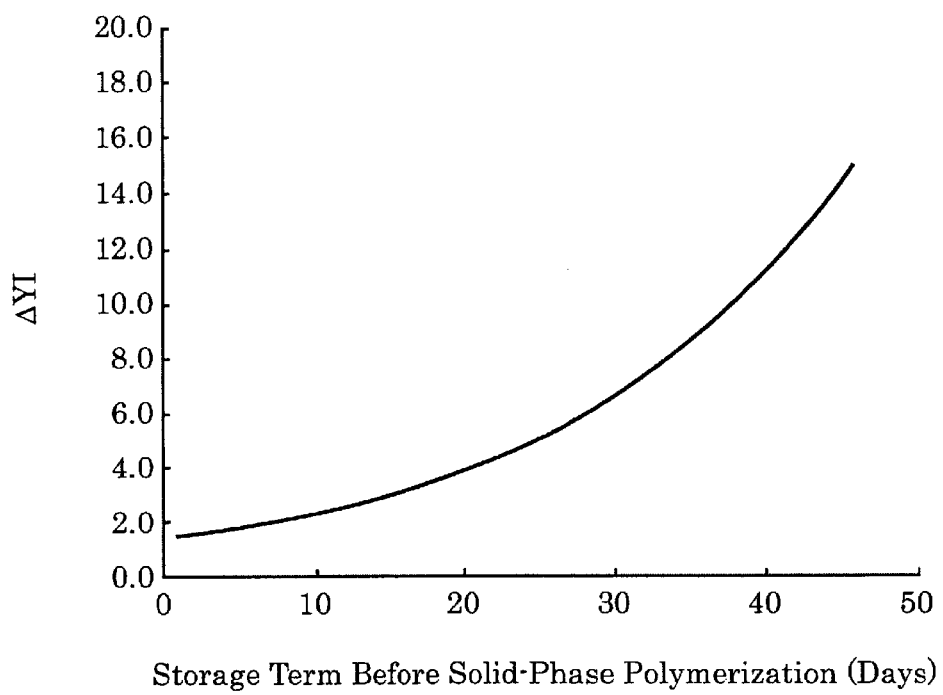
FIG. 1 is a graph showing a relationship between ΔYI and the number of days lapsed until the solid-phase polymerization (storage term from the production of the polyamide until subjecting to the solid-phase polyamide) measured in Reference Example.

The present invention will be described below in detail.

In the present invention, the polyamide used as a starting material for a solid-phase drying or a solid-phase polymerization is a polyamide produced from a diamine component containing 70 mol % or more of xylylene diamine and a dicarboxylic acid component containing 70 mol % or more of adipic acid. In addition to a melt-polymerized polyamide, a polyamide that is solid-phase dried or solid-phase polymerized after the melt-polymerization for re-drying or further increasing the molecular weight may be also used as the starting polyamide. Xylylene diamine includes m-xylylene diamine, p-xylylene diamine and o-xylylene diamine, and these may be used singly or in combination of two or three.

Examples of the polyamide-forming compounds other than xylylene diamine and adipic acid include, not particularly limited thereto, lactams such as caprolactam, valerolactam, laurolactam and undecanolactam; aminocarboxylic acids such as 1,1-aminoundecanoic acid and 1,2-aminododecanoic acid; diamines such as trimethylene diamine, tetramethylene diamine, pentamethylene diamine, hexamethylene diamine, 1,7-diaminoheptane, 1,8-diaminooctane, 1,9-diaminononane, 1,10-diaminodecane, 1,2-bis(aminomethyl)cyclohexane, 1,3-bis(aminomethyl)cyclohexane, 1,4-bis(aminomethyl)cyclohexane, o-phenylene diamine, m-phenylene diamine and p-phenylene diamine; and dicarboxylic acids such as succinic acid, glutaric acid, pimelic acid, suberic acid, azelaic acid, sebacic acid, dodecanedioic acid, phthalic acid, isophthalic acid, terephthalic acid and 2,6-naphthalenedicarboxylic acid.

The present invention is effective for a polyamide having a structural unit such as benzylmethylene that is relatively susceptible to heat decomposition, i.e., a polyamide produced by the polycondensation of a diamine component containing 70 mol % or more of xylylene diamine and a dicarboxylic acid component containing 70 mol % or more of adipic acid. A more remarkable effect can be obtained when the polyamide is produced by the polycondensation of a diamine component containing 70 mol % or more of xylylene diamine that comprises at least 70 mol % or more of m-xylylene diamine and a dicarboxylic acid component containing 70 mol % or more of adipic acid. Since the present invention is based on the knowledge about the sorption of oxygen into a polyamide, the present invention is particularly effective for a polyamide less permeable to oxygen, namely, a polyamide having a low oxygen diffusion/dissolution rate which is produced by the polycondensation of a diamine component containing 70 mol % or more of xylylene diamine and a dicarboxylic acid component containing 70 mol % or more of adipic acid. Since polyamides, such as Nylon 6, Nylon 66, etc., other than the polyamide to which the present invention is applied are highly permeable to oxygen, i.e., are high in the oxygen diffusion/dissolution rate, it is substantially and very difficult to control the sorption amount of oxygen. In addition, in the case of polyamides other than the polyamide used in the present invention, the oxygen once entrapped into a polymer can be easily removed from the polymer. Thus, the effect of the present invention is less appreciated in the polyamides other than the polyamide mentioned in the present invention.

The polyamide may be added with a phosphorus compound such as phosphoric acid, phosphorous acid, hypophosphorous acid, and salts or esters of the preceding acids to promote the polymerization reaction during the melt-polymerization step and the solid-phase polymerization step. These phosphorus compounds may be used alone or in combination of two or more. The phosphorus compound may be added to a nylon salt solution as a starting material for polyamide production, added to a diamine or a dicarboxylic acid, or added to the system during the melt-polymerization, although not particularly limited thereto.

In the industrial production of a solid-phase dried polyamide or a solid-phase polymerized polyamide, the starting polyamide is relatively rapidly subjected to the subsequent solid-phase drying or solid-phase polymerization at the same site or at a site closely adjacent to the site where the starting polyamide is produced by the melt-polymerization or other methods. If a prompt transit from the production of the starting polyamide to the subsequent solid-phase drying or solid-phase polymerization is ensured, the present invention that relates to the storage conditions for polyamide may be little important. However, the present invention is very useful when the starting polyamide cannot be solid-phase dried or solid-phase polymerized immediately after its production because of troubles in the apparatus for the solid-phase drying or solid-phase polymerization, when the solid-phase drying should be made again after the solid-phase drying or the solid-phase polymerization because of moisture absorption, etc., or when the solid-phase polymerization is to be made for further increasing the molecular weight after the solid-phase drying or the solid-phase polymerization. Under recent trends of diversification in market needs and globalization of production sites, the production site of the melt-polymerization, etc. for the starting polyamide is far apart from the site of the solid-phase drying and the solid-phase polymerization, the production of polyamide is entrusted to another company, or the solid-phase drying or the solid-phase polymerization requires an apparatus with specific design for adding an additive, etc. which is not available at the production site for the starting polyamide. In such cases, the present invention is also very useful. Thus, the present invention exhibits remarkable effect, in particular, when the starting polyamide is solid-phase dried or solid-phase polymerized after the lapse of 20 days or more from the production of the starting polyamide.

In the present invention, the starting polyamide is preferably stored under conditions of shielding light so as to prevent the starting polyamide from being exposed to a direct sunlight, and at a temperature less than Tg (glass transition temperature of the starting polyamide). When the starting polyamide is exposed to light, the yellowness of a solid-phase dried or solid-phase polymerized polyamide is likely to increase even if the yellowness of the starting polyamide is not increased. From this fact, it would be readily presumed that the light affects the polymer chain to form radicals, etc., although no change is visually noticed. To avoid the coloring due to the oxidative degradation during the storage, the storing temperature is preferably less than Tg. When an amorphous polyamide is stored, the blocking such as sticking of polyamide can be also prevented by storing at a temperature less than Tg.

The conditions for storing the starting polyamide, i.e., the conditions to which the starting polyamide is exposed, depend closely on the concentration of oxygen that is brought into sorption to the starting polyamide. The oxygen sorbed on the surface then diffuses/dissolves towards the central portion of the starting polyamide at which the oxygen presents in a low concentration. Such oxygen having entered into inside the polyamide is difficult to be removed or replaced by another gaseous material. To prevent the increase of yellowing due to the oxidative degradation during the solid-phase drying or the solid-phase polymerization, therefore, it is necessary to control the amount of sorbed oxygen to the starting polyamide within a low level. The diffusion/dissolution phenomena of a low molecular substance such as oxygen into a polymer are affected by oxygen concentration, time, temperature, states of polymer molecule, crystallization degree, and moisture to be dissolved into polymer, i.e., relative humidity of the atmosphere to which polyamide is exposed. Therefore, the polyamide to be used as a starting material for the production of a solid-phase dried or solid-phase polymerized polyamide is preferably stored, after its production, under the conditions satisfying the following Formula A:

$$0.8 \times 10^{-9} \geq P \times D^{0.5} \times exp\{-6002/T + (1-2 \times C/100) \times (a \times (h/100-0.6)^2 + 0.62)\} \quad (A)$$

wherein P is an oxygen partial pressure (MPa) of an atmosphere to which the polyamide is exposed; h is a relative humidity (%RH) of the atmosphere to which the polyamide is exposed; D is a storage time (days); T is a temperature (K) of the atmosphere to which the polyamide is exposed; C is a crystallization degree (%) of the starting polyamide; a is a numerical value of 2.9 when h is less than 60%RH or 18.8 when h is 60%RH or higher.

During the practical storage operation, the storage conditions such as the temperature and the humidity are not maintained constant and likely to vary. In this case, the other storage conditions can be calculated from Formula A by substituting respective average values for the temperature, the humidity, etc. If the daily average temperature varies by 5° C. or more or the daily average humidity varies by 20%RH or more during the storage, the storage conditions are determined from Formula A preferably in the following manner. First, the storage term is divided into several portions so that, in each portion, the variation of the average temperature is less than 5° C. and the variation of the average humidity is less than 20%RH. Then, the average temperature and the average humidity of each portion are substituted for T and h of Formula A to calculate the other storage conditions. The overall storage conditions are determined by taking the obtained values into account additionally and cumulatively.

As seen from Formula A, the temperature (T) of the atmosphere to which the starting polyamide is exposed is closely related to the other storage conditions and not determined unequivocally. However, to control the diffusion/dissolution rate of oxygen within a low level, the temperature is preferably 50° C. or lower, more preferably 40° C. or lower.

As seen from Formula A, the oxygen partial pressure (P) of the atmosphere to which the starting polyamide is exposed is closely related to the other storage conditions and not determined unequivocally. However, to control the diffusion/dissolution rate of oxygen within a low level, the oxygen partial pressure is preferably 0.01 MPa or lower. In particular, when the starting polyamide is solid-phase dried or solid-phase polymerized after the lapse of several months from its production, the oxygen partial pressure is preferably controlled to 0.001 MPa or lower. To attain such a low oxygen partial pressure, it is preferable to store the polyamide in nitrogen atmosphere or to place a deoxidizing agent in a storing container.

As seen from Formula A, the crystallization degree (C) of the starting polyamide is closely related to the other storage conditions and not determined unequivocally. However, since the diffusion/dissolution of oxygen does not occur in the crystalline region, the crystalline region is considered to act as a barrier against the diffusion/dissolution of oxygen. In consideration this, the crystallization degree is preferably 20% or more, more preferably 25% or more. In the present invention, the crystallization degree was determined by an exotherm peak due to crystallization and an endotherm peak due to fusion, each being observed during the measurement by differential scanning calorimetry (DSC).

As seen from Formula A, the humidity (h) of the atmosphere to which the starting polyamide is exposed is closely related to the other storage conditions and not determined unequivocally. However, since the diffusion/dissolution rate of oxygen into the polyamide becomes higher as the humidity approaches as close as to 100%RH or 0%RH, the humidity during the storage is preferably 20 to 80%RH, more preferably 30 to 70%RH, inclusive of lower and upper limits.

As seen from Formula A, the storage time (D) is closely related to the other storage conditions and not determined unequivocally. However, in the preferred embodiment of the present invention, the storage time is preferably one year or shorter, more preferably three month or shorter, each from the production of the starting polyamide.

If the oxygen concentration of the atmosphere to which the polyamide is exposed is higher than the oxygen concentration inside the polyamide, oxygen is sorbed on the polyamide and then enters for diffusion/dissolution towards the inside thereof where oxygen present in a low concentration. On the other hand, if the oxygen concentration of the atmosphere is lower than the oxygen concentration inside the polyamide, the sorbed oxygen on the surface of polyamide is desorbed and diffused into the surrounding atmosphere. In addition, the diffused/dissolved oxygen inside the polyamide again comes, by diffusion/dissolution, to its surface where the oxygen concentration is low. It is generally difficult to easily remove the oxygen sorbed inside the polymer and replace it with another gas. However, the oxygen sorbed on the surface can be removed in relatively easy manner such as evacuation and replacement by another gas such as nitrogen and hydrogen. Therefore, the oxygen sorbed during the storage can be removed by controlling the oxygen concentration of the atmosphere to which the polyamide is exposed lower than the oxygen concentration inside the polyamide, thereby enabling the production of a solid-phase dried or solid-phase polymerized polyamide with a low yellowness. The desorption of oxygen is affected the basically same factors as in the case of the sorption of oxygen. Namely, the oxygen that is sorbed during the storage can be effectively removed by controlling the oxygen concentration of the atmosphere to which the polyamide is exposed lower than the oxygen concentration inside the polyamide, simultaneously by controlling the treating time loner, the treating temperature higher, the crystallization degree lower and the relative humidity of the atmosphere to which the polyamide is exposed 20%RH or lower, alternatively, 80%RH or higher. When the desorption of the oxygen substantially sorbed on the surface of the polyamide is intended, the state of the polymer molecules such as the crystallization degree and the relative humidity of the atmosphere to which the polyamide is exposed less influence the desorption, and the control of the temperature and time are more important. Thus, in the present invention, it is preferred to expose the polyamide to an atmosphere of an oxygen partial pressure of 1 kPa or lower at 120° C. or lower for 2 h or more, and then, initiate the solid-phase drying or the solid-phase polymerization. An atmosphere of an oxygen partial pressure of 0.5 kPa is more preferred. The treatment is preferably carried out at 120° C. or lower because the oxidative degradation becomes severe when the temperature exceeds 120° C. The above treatment is effective and preferred when carried out prior to the solid-phase drying or the solid-phase polymerization in the same apparatus for the subsequent solid-phase drying or solid-phase polymerization. Although the removal of oxygen in the apparatus prior to the solid-phase drying or the solid-phase polymerization has been hitherto usually conducted, its main purpose is to prevent the oxidative degradation during the solid-phase drying or the solid-phase polymerization merely removing oxygen in the atmosphere. The removal of oxygen sorbed to the polyamide proposed by the present invention is not conducted in the prior art.

The apparatus for carrying out the solid-phase drying or the solid-phase polymerization of the present invention is not specifically limited, and may be a batch-wise apparatus or a continuous-type apparatus as far as it is designed for use as a heating apparatus. In case of using a batch-wise heating apparatus, the heating is effected generally by the heat from the heat transfer surface of the apparatus while flowing an inert gas such as nitrogen or evacuating the apparatus. Examples of the batch-wise heating apparatus include a rotary drum heating apparatus that is generally called as a tumble dryer, a conical dryer and rotary dyer, and a conical heating apparatus equipped with inner rotary blades that is generally called as Nauta mixer. As the continuous-type heating apparatus, usable are a vertical gas flow dryer that is generally called as a hopper dryer where the heating is effected by the flow of heated dry nitrogen, a horizontal heat transfer dryer that is generally called as a paddle dryer where the heating is effected by the heat from the heat transfer surface of the apparatus while flowing nitrogen.

The conditions for the solid-phase drying are preferably selected from temperatures and drying times which do not cause the polymerization of the polyamide and which ensure a sufficient removal of water in the polyamide. Preferably, the temperature is selected from the range of Tg or higher and 150° C. or lower. To prevent the oxidative degradation during the drying operation, the solid-phase drying is preferably carried out in a stream of a dried inert gas such as nitrogen or under reduced pressure, preferably 40 kPa or lower. The drying time may be set so that the water content of the polyamide reaches a predetermined level, and preferably at least 30 min under the above temperature range and evacuation condition.

The solid-phase polymerization is preferably carried out at a temperature that allows the polymerization of the polyamide to easily proceed and lower than the melting point of the polyamide. More preferably, the temperature is selected from the range of 140° C. or higher and a temperature lower than the melting point by 20° C. or more. To prevent the oxidative degradation, the solid-phase polymerization is preferably carried out in a stream of an inert gas such as nitrogen or under reduced pressure, preferably 40 kPa or lower. The polymerization time may be set so that the polyamide reaches a predetermined molecular weight, and preferably at least 30 min under the above temperature range and evacuation condition.

By following the solid-phase drying or solid-phase polymerization method of the present invention, a solid-phase dried or solid-phase polymerized polyamide with a low yellowness can be efficiently produced even when the starting polyamide cannot be subjected to the solid-phase drying or solid-phase polymerization immediately after its production.

The present invention will be explained in more detail by reference to the following examples which should not be construed to limit the scope of the present invention. The measurements for evaluations were conducted by the following methods.

1. Yellowness Index (YI)

Tristimulus values X, Y and Z of a standard calorimetric system were measured on a reflected light from a specimen according to JIS-K7103 using a color difference meter (Σ80 Model manufactured by Nippon Denshoku Kogyo Co., Ltd.). The yellowness index was calculated from the following equation:

$$YI=100\times(1.28X-1.06Z)/Y.$$

2. Crystallization Degree

Differential scanning calorimetric (DSC) measurement was carried out using a DSC (3100 Model) manufactured by Mac Science Co., Ltd. at a temperature rising rate of 10° C./min under nitrogen flow. The crystallization degree was determined from the heat of crystal fusion based on the exotherm peak due to crystallization and the endotherm peak due to fusion during the measurement.

REFERENCE EXAMPLE

Pellets (crystallization degree: 5%) of poly(m-xylylene adipamide) (hereinafter referred to as "nylon MXD6") prepared by melt polymerization were placed in a thermo-hygrostat of 5%RH and 23° C. and stored in air while shielding against light for respective terms from 3 to 45 days. After the lapse of respective storage terms, the pellets were introduced into a batch-wise solid-phase polymerization apparatus. The inner air of the apparatus was replaced with nitrogen, and the temperature of the apparatus was raised from room temperature to initiate the solid-phase polymerization. When the temperature of pellets reached 135° C., the evacuation was started to reduce the pressure to 1.33 kPa or lower. The temperature was continually raised and the heating was stopped when the temperature of pellets reached 200° C., and the inner pressure was returned to ordinary pressure by introducing nitrogen to start the cooling. After the temperature of pellets was lowered to 80° C., the solid-phase polymerized polyamide was taken out of the polymerization apparatus to measure the yellowness index (YI). The solid-phase polymerization was carried out so that pellets stored for different terms were subjected to the same heat history. Separately, YI of a solid-phase polymerized polyamide that was prepared by the solid-phase polymerization immediately after the melt polymerization and pelletization was measured and used as the reference YI. In FIG. 1, the differences (ΔYI) between YI of pellets stored for different terms and the reference YI are plotted.

As seen from FIG. 1, when the polyamide was stored under conditions not controlled as in the present invention, ΔYI begins to increase more steeply, i.e., the yellowness of the final solid-phase polymerized polyamide abruptly increases when the storage term exceeds 20 days or so.

EXAMPLES 1–2 AND COMPARATIVE EXAMPLES 1–2

Pellets (crystallization degree: 5%) of nylon MXD6 prepared by the melt polymerization in the same manner as in Reference Example were stored in a light-shielded thermo-hygrostat under the conditions shown in Table 1. Then, the pellets were solid-phase polymerized in the same manner as in Reference Example, and the yellowness index (YI) of the resultant solid-phase polymerized polyamide was measured. The results are shown in Table 1.

EXAMPLE 3

Pellets of nylon MXD6 prepared by the melt polymerization in the same manner as in Reference Example were placed in a sealed stainless container together with a deoxidizing agent (Ageless SA manufactured by Mitsubishi Gas Chemical Company, Inc.) to keep the inner atmosphere at non-oxygen state. After stored under the conditions shown in Table 1, the pellets were solid-phase polymerized in the same manner as in Reference Example, and the yellowness index (YI) of the resultant solid-phase polymerized polyamide was measured. The humidity shown in Table 1 is a humidity of the inner atmosphere of the sealed stainless container at the end of the storage. The results are shown in Table 1.

EXAMPLE 4

Pellets of nylon MXD6 prepared by the melt polymerization in the same manner as in Reference Example were heated immediately after the melt polymerization and held at 140° C. for 6 h under reduced pressure to promote the crystallization, thereby obtaining pellets of a crystallization degree of 33%. The pellets were placed in a light-shielded thermo-hygrostat and stored under the conditions shown in Table 1. The stored pellets were solid-phase polymerized in the same manner as in Example 1, and the yellowness index (YI) of the resultant solid-phase polymerized polyamide was measured. The difference (ΔYI) of the measured yellowness index and YI of a solid-phase polymerized polyamide that was separately prepared by solid-phase polymerizing the pellets immediately after the crystallization is shown in Table 1.

TABLE 1

|  | Ex. 1 | Com. Ex. 1 | Ex. 2 | Com. Ex. 2 | Ex. 3 | Ex. 4 |
| --- | --- | --- | --- | --- | --- | --- |
| Crystallization degree (%) | 5 | 5 | 5 | 5 | 5 | 33 |
| Storage term (days) | 36 | 36 | 130 | 130 | 240 | 130 |
| Oxygen partial pressure (MPa) | 0.02 | 0.02 | 0.02 | 0.02 | 0.00 | 0.02 |
| Temperature (° C.) | 10 | 60 | 23 | 23 | 23 | 23 |
| Humidity (% RH) | 5 | 5 | 60 | 20 | 20 | 20 |
| Right side of Formula A | 0.29 | 6.92 | 0.63 | 0.95 | 0.00 | 0.52 |
| ΔYI | 3 | 30 | 13 | 22 | 0.0 | 5 |

As seen from Table 1, the yellowness the solid-phase polymerized polyamide was reduced by suitably controlling the oxygen partial pressure, temperature and relative humidity of the atmosphere to which the polyamide is exposed, the storage term, and the crystallization degree of pellets.

COMPARATIVE EXAMPLE 3

Pellets (crystallization degree: 1%) of a polyamide prepared by the melt polymerization of 1,3-bis(aminomethyl) cyclohexane and adipic acid (hereinafter referred to as "nylon 1,3BAC6") were placed in a light-shielded thermo-hygrostat and stored under the conditions shown in Table 2. Then, the pellets were solid-phase polymerized in the same manner as in Reference Example, and the yellowness index (YI) of the resultant solid-phase polymerized polyamide was measured. The difference (ΔYI) of the measured yellowness index and YI of a solid-phase polymerized polyamide that was separately prepared by solid-phase polymerizing the pellets immediately after the melt polymerization is shown in Table 2.

TABLE 2

|  | Com. Ex. 3 |
|---|---|
| Crystallization degree (%) | 1 |
| Storage term (days) | 240 |
| Oxygen partial pressure (MPa) | 0.02 |
| Temperature (° C.) | 23 |
| Humidity (% RH) | 50 |
| ΔYI | 0 |

As seen from Table 2, the yellowness of nylon 1,3BAC6 was independent of the conditions for storing the starting pellets. Namely, the storage conditions of the present invention are specific for a polyamide constituted by a diamine component mainly comprising xylylene diamine.

EXAMPLE 5 AND COMPARATIVE EXAMPLE 4

Pellets (crystallization degree: 5%) of nylon MXD6 prepared in the same manner as in Reference Example were placed in a light-shielded thermo-hygrostat and stored under the following conditions:

Storage term: 36 days

Oxygen partial pressure: 0.02 MPa

Temperature: 23° C.

Humidity: 5%RH

Then, the pellets were place in a batch-wise solid-phase polymerization apparatus, followed by replacing the inner air of the apparatus with nitrogen (oxygen partial pressure: 0.5 kPa). To initiate the solid-phase polymerization, the temperature of the apparatus was raised from room temperature. When the temperature of pellets reached 135° C., the evacuation was started to reduce the pressure to 1.33 kPa or lower. The temperature was continually raised and the heating was stopped when the temperature of pellets reached 200° C., and the inner pressure was returned to ordinary pressure by introducing nitrogen to start the cooling. After the temperature of pellets was lowered to 80° C., the solid-phase polymerized polyamide was taken out of the polymerization apparatus to measure the yellowness index (YI). In the above procedures, the temperature rising time taken from placing the pellets in the solid-phase polymerization apparatus and replacing the inner atmosphere with nitrogen until the inner temperature reached 120° C. was 2.5 h for Example 5 and 50 min for Comparative Example 4. YI of each solid-phase polymerized polyamide is shown in Table 3.

TABLE 3

|  | Example 5 | Comparative Example 4 |
|---|---|---|
| Temperature rising time (h) | 2.5 | 0.5 |
| YI | −2 | 3 |

As seen from Table 3, by removing the sorbed oxygen on the nylon MXD6 pellets under conditions specified in the present invention prior to the solid-phase polymerization, the yellowness of the resultant solid-phase polymerized polyamide was effectively reduced.

What is claimed is:

1. A method for solid-phase drying or solid-phase polymerizing a polyamide that comprises a diamine component containing 70 mol % or more of xylylene diamine and a dicarboxylic acid component containing 70 mol % or more of adipic acid, the method comprising solid-phase drying or solid-phase polymerizing the polyamide that is stored for 20 days or longer after the production thereof until subjected to the solid-phase drying or the solid-phase polymerization under conditions satisfying the following Formula A:

$$0.8 \times 10^{-9} \geq P \times D^{0.5} \times exp\{-6002/T+(1-2\times C/100)\times(a\times(h/100-0.6)^2 + 0.62)\} \quad (A)$$

wherein P is an oxygen partial pressure (MPa) of an atmosphere to which the polyamide is exposed; h is relative humidity (%RH) of the atmosphere to which the polyamide is exposed; D is a storage time (days); T is a temperature (K) of the atmosphere to which the polyamide is exposed; C is a crystallization degree (%) of the polyamide; a is a numerical value of 2.9 when h is less than 60%RH or 18.8 when h is 60%RH or higher, at a temperature lower than a glass transition temperature of the polyamide while shielding against light.

2. The method according to claim 1, wherein 70 mol % or more of the xylylene diamine is m-xylylene diamine.

3. The method according to claim 1, wherein the solid-phase drying or the solid-phase polymerization is carried out in a batch-wise rotary heating apparatus.

4. The method according to claim 1, wherein the solid-phase drying or the solid-phase polymerization is carried out in a continuous-type nitrogen-flow heating apparatus.

5. The method according to claim 1, wherein the polyamide is stored at 50° C. or lower.

6. The method according to claim 1, wherein the oxygen partial pressure of the atmosphere to which the polyamide is exposed is 0.01 MPa or lower.

7. The method according to claim 1, wherein the crystallization degree of the polyamide is 20% or more.

8. The method according to claim 1, wherein the relative humidity of the atmosphere to which the polyamide is exposed is 20 to 80%RH.

9. A method for solid-phase drying or solid-phase polymerizing a polyamide that comprises a diamine component containing 70 mol % or more of xylylene diamine and a dicarboxylic acid component containing 70 mol % or more of adipic acid, the method including a step of exposing the polyamide to an atmosphere having an oxygen partial pressure of 1 kPa or less at 120° C. or lower for 2 h or more in an apparatus prior to the solid phase drying or the solid-phase polymerizing, thereby desorbing oxygen sorbed by the polyamide.

10. The method according to claim 9, wherein nitrogen and/or water is introduced into the apparatus to reduce the oxygen partial pressure.

11. The method according to claim 9, wherein the apparatus is evacuated to reduce the oxygen partial pressure.

12. The method according to claim 1, wherein the polyamide is stored at 40° C. or lower.

13. The method according to claim 12, wherein the oxygen partial pressure of the atmosphere to which the polyamide is exposed is 0.001 MPa or lower.

14. The method according to claim 13, wherein the polyamide is stored in a nitrogen atmosphere.

15. The method according to claim 13, wherein the polyamide is stored in a storing container, in the presence of a deoxidizing agent.

16. The method according to claim 13, wherein the relative humidity during storage of the polyamide is 30 to 70% RH.

17. The method according to claim 16, wherein the crystallization degree of the polyamide is at least 25%.

18. The method according to claim 1, including the additional step of storing the polyamide at least 20 days under said conditions satisfying said Formula A, prior to the solid-phase drying or the solid-phase polymerizing.

19. The method according to claim 9, including the further step of solid-phase drying or solid-phase polymerizing the polyamide, after said step of exposing the polyamide.

* * * * *